(12) United States Patent
Tagomori

(10) Patent No.: US 12,118,585 B2
(45) Date of Patent: Oct. 15, 2024

(54) INFORMATION PROCESSING DEVICE

(71) Applicant: NOMURA RESEARCH INSTITUTE, LTD., Tokyo (JP)

(72) Inventor: Teruhiro Tagomori, Irvine, CA (US)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 0 days.

(21) Appl. No.: 17/382,413

(22) Filed: Jul. 22, 2021

(65) Prior Publication Data
US 2023/0022051 A1    Jan. 26, 2023

(51) Int. Cl.
| | |
|---|---|
| G06Q 30/02 | (2023.01) |
| G06Q 30/0201 | (2023.01) |
| G06Q 30/0242 | (2023.01) |
| G06Q 30/0251 | (2023.01) |
| G06Q 30/0601 | (2023.01) |
| G06Q 30/0241 | (2023.01) |

(52) U.S. Cl.
CPC ..... *G06Q 30/0244* (2013.01); *G06Q 30/0201* (2013.01); *G06Q 30/0246* (2013.01); *G06Q 30/0253* (2013.01); *G06Q 30/0623* (2013.01); *G06Q 30/0625* (2013.01); *G06Q 30/0256* (2013.01); *G06Q 30/0276* (2013.01)

(58) Field of Classification Search
CPC .......... G06Q 30/0244; G06Q 30/0246; G06Q 30/0625; G06Q 30/0276
See application file for complete search history.

(56) References Cited

U.S. PATENT DOCUMENTS

| | | | |
|---|---|---|---|
| 10,313,262 B1* | 6/2019 | Brasch | H04L 47/70 |
| 10,346,893 B1* | 7/2019 | Duan | G06N 3/08 |
| 2015/0032551 A1* | 1/2015 | Ekambaram | G06Q 30/0271 |
| | | | 705/14.67 |
| 2019/0050427 A1 | 2/2019 | Wiesel et al. | |
| 2022/0138805 A1* | 5/2022 | Lemmons | G06F 16/535 |
| | | | 705/14.72 |
| 2022/0417592 A1* | 12/2022 | Emmanuel | H04N 21/812 |
| 2023/0020218 A1* | 1/2023 | Berger | G06V 40/161 |

FOREIGN PATENT DOCUMENTS

JP    2018-77615 A    5/2018

OTHER PUBLICATIONS

Fatigue-Aware Ad Creative Selection; Daisuke Moriwaki et al.; RIKEN center for Advanced Intelligence Project; Jan. 14, 2020. (Year: 2020).*
Extended European Search Report (EESR) dated Nov. 16, 2022 for European Patent Application No. 22181538.4.

* cited by examiner

*Primary Examiner* — Breffni Baggot
(74) *Attorney, Agent, or Firm* — RANKIN, HILL & CLARK LLP

(57) ABSTRACT

An information processing device applies a machine learning model to content for a specific thing for sale to generate changed content in which a predetermined portion other than the specific thing for sale in the content is changed, provides a user with the changed content having been generated, and applies a machine learning model to content for another thing for sale and changes a predetermined portion other than the other thing for sale in accordance with an action of the user with respect to the changed content in the content for the other thing for sale to generate changed content for the other thing for sale.

6 Claims, 17 Drawing Sheets

FIG. 7

| USER ID | ATTRIBUTE 1 (e.g., AGE) | ... | ATTRIBUTE n | ACCESS HISTORY 1 (CONTENT ID) | ... | ACCESS HISTORY m (CONTENT ID) |
|---|---|---|---|---|---|---|
| 1 | A | ... | zzz | C1 | ... | ... |
| 2 | B | ... | yyy | C2 | ... | ... |
| ... | ... | ... | ... | ... | ... | ... |

| USER ID | ATTRIBUTE 1 (e.g., AGE) | ... | ATTRIBUTE n | ... | PURCHASE HISTORY 1 (PRODUCT ID) | ... | PURCHASE HISTORY m (PRODUCT ID) |
|---|---|---|---|---|---|---|---|
| 1 | A | | zzz | ... | P1 | ... | ... |
| 2 | B | | yyy | ... | P2 | ... | ... |
| ... | ... | | ... | ... | ... | ... | ... |

FIG. 9

| CONTENT ID | CONTENT URL | THING FOR SALE | CHANGE TYPE ID | MODEL | POSE | PORTION 1 OTHER THAN THING FOR SALE | ... |
|---|---|---|---|---|---|---|---|
| C1 | image1 | HAT | 0 (ORIGINAL) | Ms. XX | A | SHIRT | ... |
| C2 | image2 | HAT | 3 | Ms. ZZ | A | SHIRT | ... |
| C3 | image3 | SHIRT | 0 | Ms. EEE | B | PAIR OF JEANS | ... |
| C4 | image4 | SHIRT | 1 | Ms. EEE | B | SKIRT | ... |
| ... | ... | ... | ... | ... | ... | ... | ... |

901: CONTENT ID
902: (CONTENT URL, THING FOR SALE, CHANGE TYPE ID)
903: (MODEL, POSE, PORTION 1 OTHER THAN THING FOR SALE, ...)
900

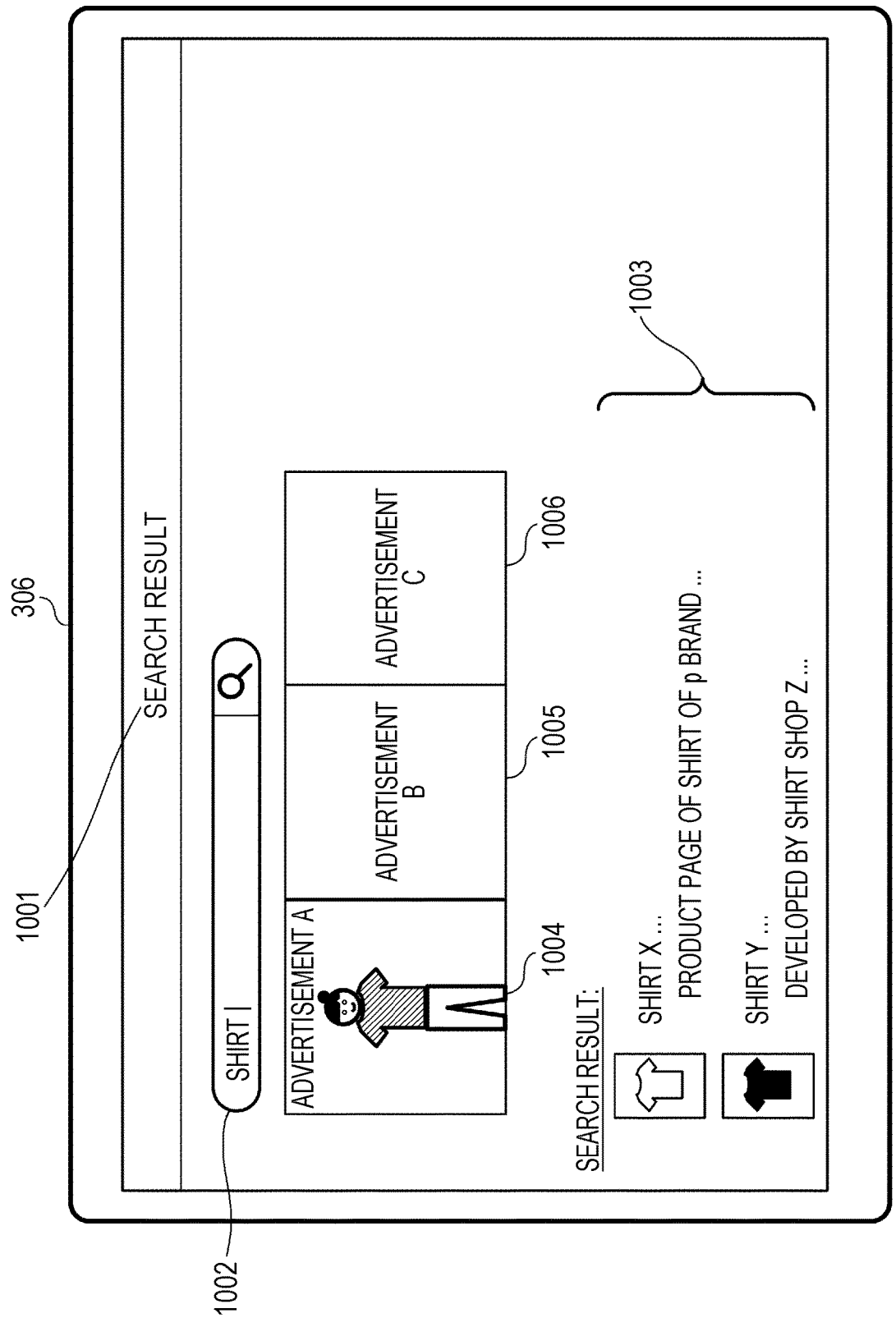

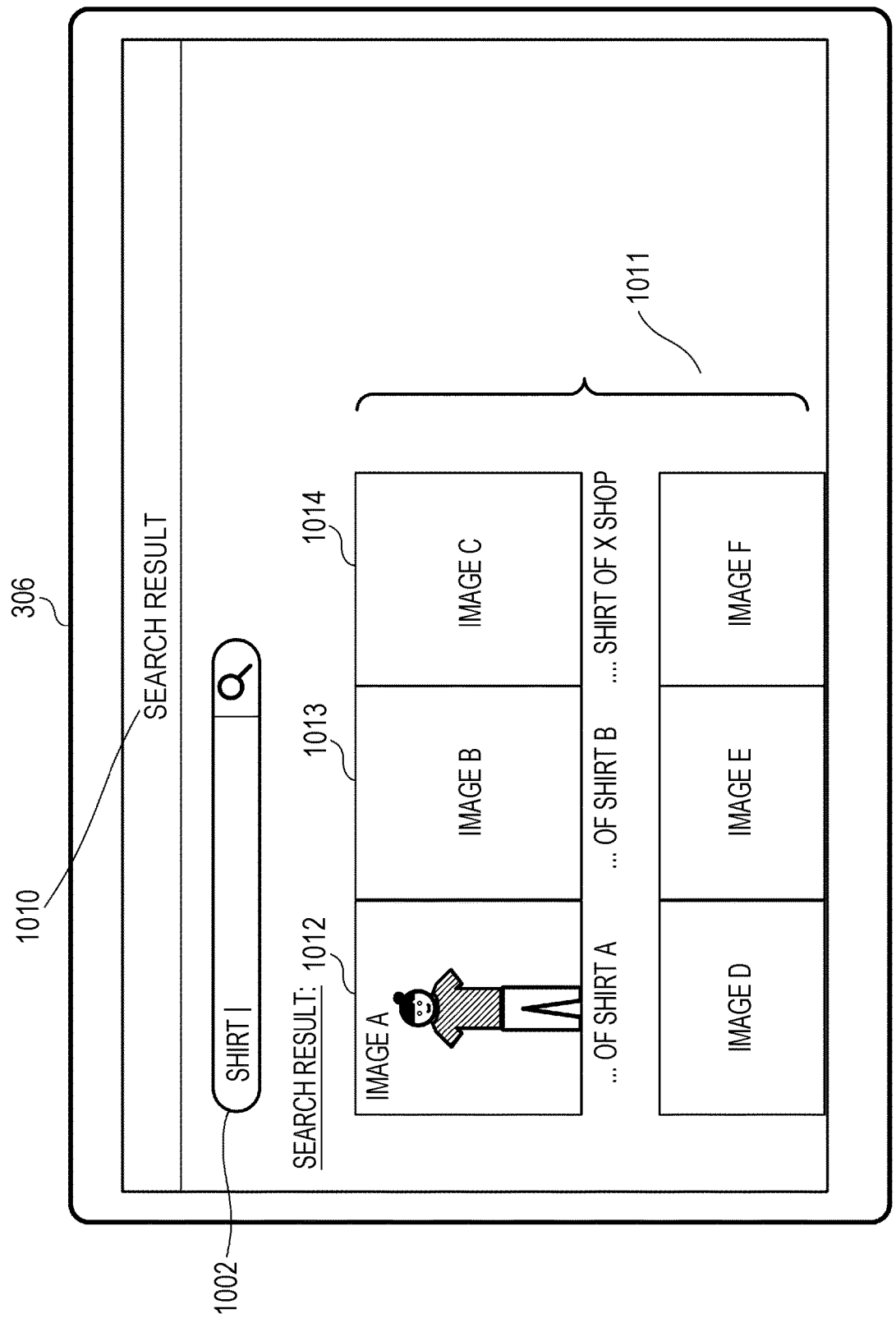

| CHANGE TYPE ID (1101) | CONTENTS OF CHANGE TYPE (1102) |
|---|---|
| 0 | ORIGINAL (NO CHANGE) |
| 1 | PAIR OF JEANS → SKIRT |
| 2 | HAIRSTYLE A → HAIRSTYLE B |
| 3 | MODEL M (Ms. XX) → MODEL N (Ms. ZZ) |
| 4 | MODEL POSE A → MODEL POSE B |
| 5 | BACKGROUND A (SCENERY OF MOUNTAIN) → BACKGROUND B (SCENERY OF SEA) |
| 6 | ... |

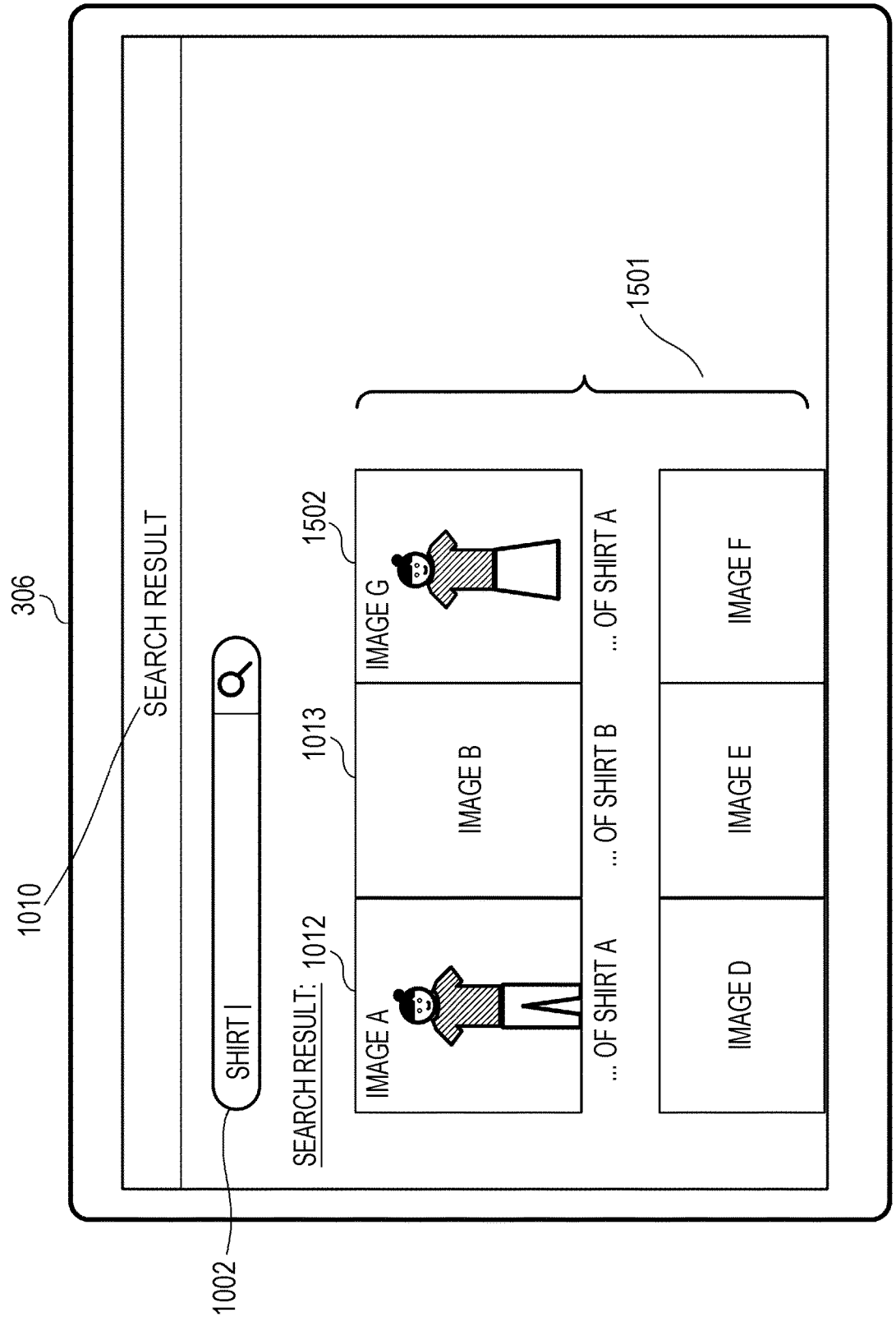

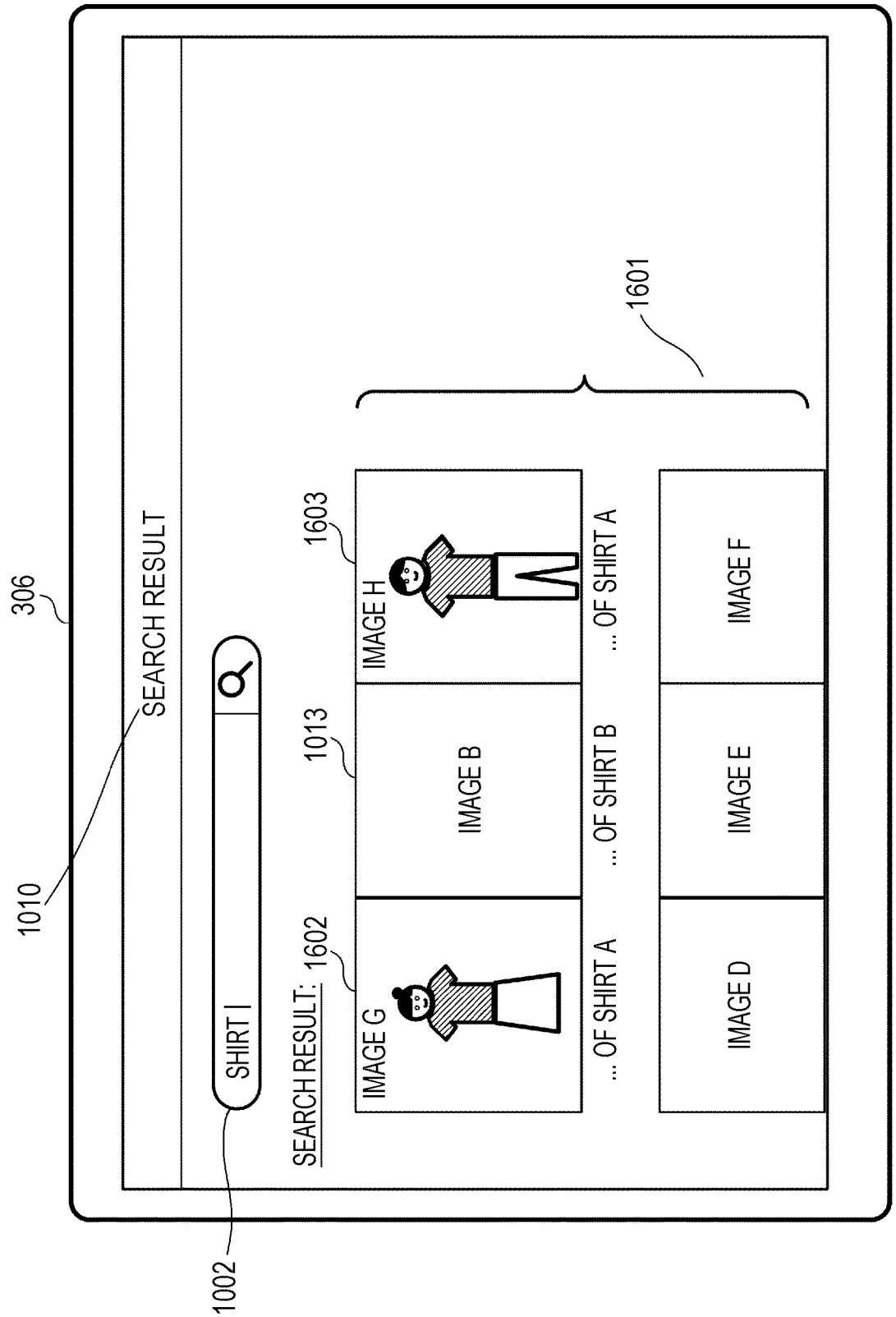

INFORMATION PROCESSING DEVICE

BACKGROUND

Technical Field

The present invention relates to an information processing device that generates new content based on content for a thing for sale using a machine learning model.

Related Art

In recent years, there is known a technology for dynamically generating an advertisement image by using calculation by a computer instead of manually generating an image to be used for an advertisement (JP 2018-077615 A). JP 2018-077615 A discloses a technology in which an advertising image generation device dynamically generates an advertising image based on a generation parameter group where each element constituting an advertisement is designated by text. Furthermore, JP 2018-077615 A discloses a technology for optimizing a generation parameter group by acquiring an advertising effect for an advertising image.

It is known that humans have a nature of developing a preference for things to which they continue to be exposed (also called the mere-exposure effect). However, it is known that this property is applicable when the humans are exposed to the same information about a few times (e.g., three times), but on the contrary, the interest is reduced if they continue to be exposed to the same information more times, for example, five times. In addition, it is also known that interest can be continued by presenting non-identical information. If information (content such as an image) regarding a thing for sale can be presented using such nature of the humans, the user's interest can be effectively attracted.

The present invention has been made in view of the above problem, and an object thereof is to achieve a technology that can generate effective content for a thing for sale that attracts an interest of a user.

SUMMARY

In order to solve this problem, for example, an information processing device of the present invention has the following configuration. That is, it is provided an information processing device including:
one or more processors; and
a memory storing one or more programs, in which executed by the one or more processors, the one or more programs cause the one or more processors to:
apply a machine learning model to content for a specific thing for sale to generate changed content in which a predetermined portion other than the specific thing for sale in the content is changed,
provide a user with the changed content having been generated, and
apply a machine learning model to content for another thing for sale and change a predetermined portion other than the other thing for sale in accordance with an action of the user with respect to the changed content in the content for the other thing for sale to generate changed content for the other thing for sale.

According to the present invention, it is possible to generate effective content for a thing for sale that attracts an interest of a user.

BRIEF DESCRIPTION OF DRAWINGS

FIG. 7 is a view showing an example of a user table according to the present embodiment;

FIG. 8 is a view showing an example of an extended user table according to the present embodiment;

FIG. 9 is a view showing an example of a content table according to the present embodiment;

FIG. 10A is a view showing an example of a search result according to the present embodiment;

FIG. 10B is a view showing another example of the search result according to the present embodiment;

FIG. 11 is a view showing an example of a change type table according to the present embodiment;

FIG. 15 is a view showing another example of the search result according to the present embodiment; and FIG. 16 is a view showing another example of the search result according to the present embodiment.

DETAILED DESCRIPTION

Figure 1:
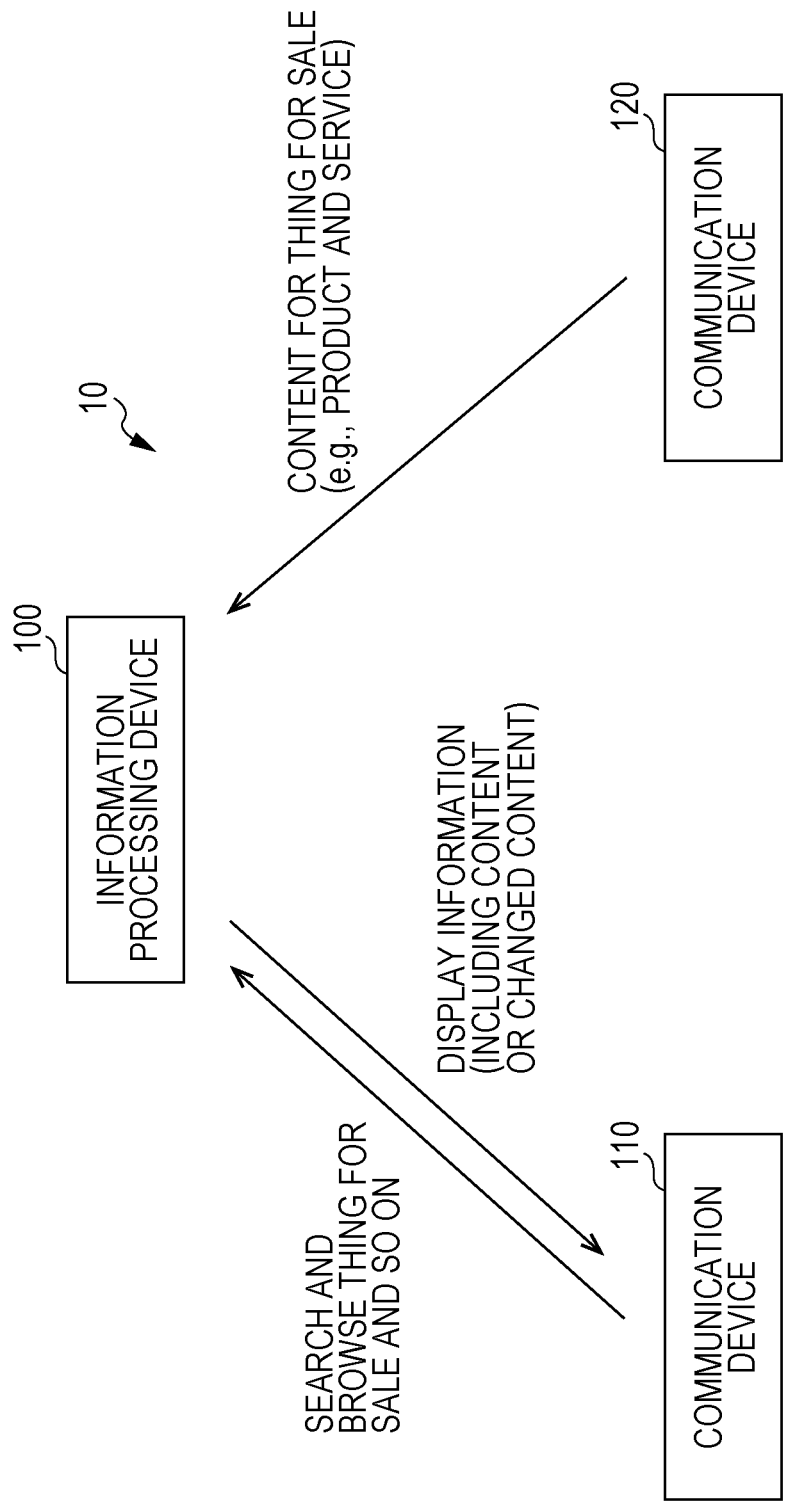
FIG. 1 is a view explaining an outline of an information processing system according to an embodiment of the present invention.

An embodiment will be described in detail below with reference to the accompanying drawings. Note that the following embodiment does not limit the invention according to the claims, and all combinations of features described in the embodiment are not necessarily essential to the invention. Two or more features of the plurality of features described in the embodiment may be discretionarily combined. In addition, the same or similar configurations are denoted by the same reference numerals, and redundant description will be omitted.

<Outline of Information Processing System>

FIG. 1 shows an outline of an information processing system according to the present embodiment. An information processing system 10 according to the present embodiment includes, for example, an information processing device 100 that is an information processing server as an example, and a communication device 110 and a communication device 120 that are smartphones as an example.

The information processing device 100 operates as, for example, a server that provides information such as a web page for electronic commerce. The information processing device 100 receives a search request or a browse request for a thing for sale (product or service) or the like from the communication device 110, and provides display information to the communication device 110. The display information includes content about a thing for sale or changed content in which the content is changed.

In the following embodiment, a case where content for a specific thing for sale is an image will be described as an example. That is, in the following description, an embodiment will be described in which a machine learning model is applied to an image for a specific thing for sale to generate changed content (changed image) in which a portion other than the specific thing for sale in the image is changed. However, the present embodiment can be applied not only to a case where the content is an image but also to a case where the content is text, a moving image, and audio. In the present embodiment, a case of an image is mainly described. However, for example, taking a moving image as an example, a moving image also has a frame configuration, and a moving image includes a set of images. Therefore, similar processing can be performed on each image. Then, if different change processing is performed on each of the frame images constituting the moving image, a coherent moving image is not obtained when reproduced. Therefore, in the case of a moving image, it is desirable that the change processing reflected in the frame images constituting the target moving image is the same type of change processing or the same change processing.

As described above, it is known that humans have a nature (mere-exposure effect) of developing a preference for things to which they continue to be exposed. It is also known that the mere-exposure effect can be obtained by being exposed to the same information about a few times (e.g., three times), but on the contrary, the interest is reduced if they continue to be exposed to the same information, for example, five times. In order to prevent such a decrease in interest, for example, a technique of continuously transmitting the same information with slight change in the information is known. Such technique includes, for example, slightly shifting the point of the information, or changing the expression but not changing the essence of the message desired to be conveyed to the consumer. Furthermore, since the human has a nature of paying attention to a change, it is possible to effectively attract attention of a human by adding a change to a thing.

In the present embodiment, by using such nature of the human, specific information is continuously provided after a slight change is added to the information to be conveyed. For example, in a case where there is content (e.g., an image) for a specific thing for sale, the information processing device 100 provides the user with the content for the specific thing for sale as it is. On the other hand, in the case of continuously providing the user with information regarding the specific thing for sale, for example, the information processing device 100 generates changed content (e.g., a changed image) in which a portion other than the specific thing for sale in the image regarding the specific thing for sale is changed. Then, the information processing device 100 provides the generated changed content to the user. This makes it possible to continuously present the information regarding the specific thing for sale to the user while preventing the interest of the user from decreasing. After providing content for a specific thing for sale to as it is about three times, the information processing device 100 may provide the user with changed content. Furthermore, in the present embodiment, what kind of changed content attracts the interest of the user is analyzed, and a change method by which the user is interested is applied to content for another thing for sale.

Figure 12:
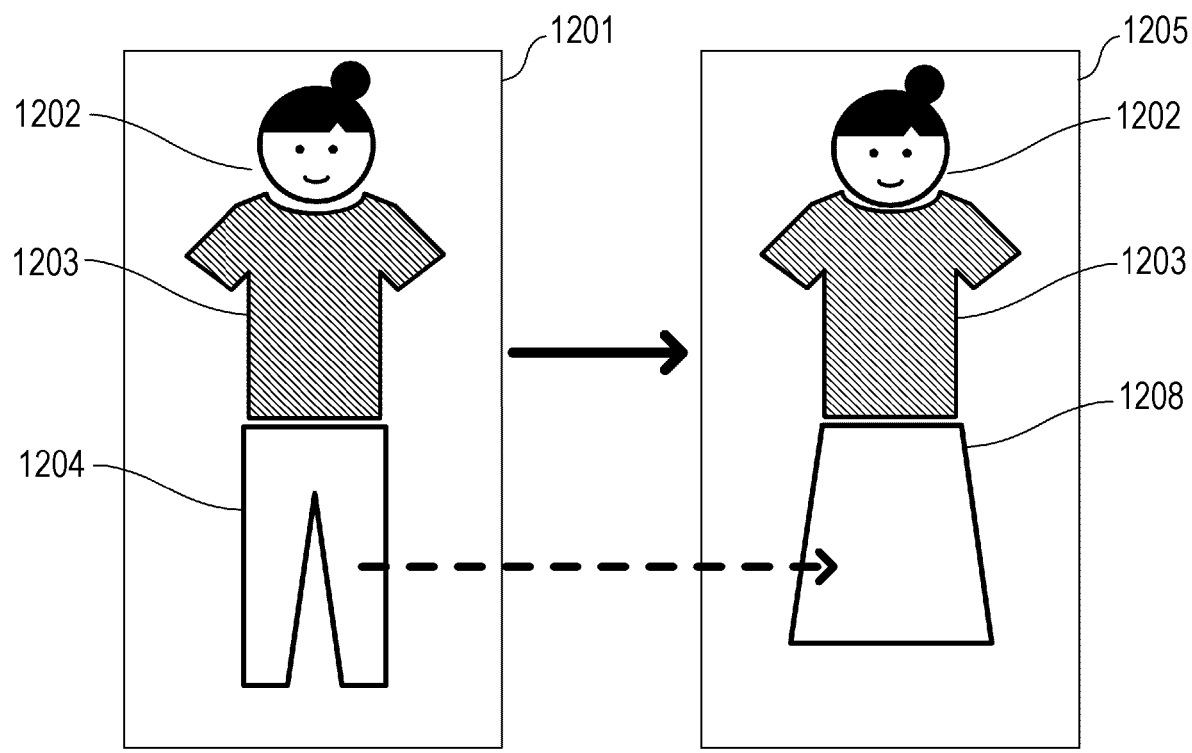
FIG. 12 is a view showing an example of changed content according to the present embodiment.

Content for a specific thing for sale and changed content will be described with reference to FIG. 12, for example. In the example shown in FIG. 12, the specific thing for sale is a shirt, and the content is an image. An image 1201 is an image of a specific thing for sale (e.g., a shirt), and a model 1202 (fashion model) wearing a shirt 1203 for sale appears in the image 1201. In the image 1201, the model 1202 is wearing a pair of jeans 1204. The image 1201 is, for example, an image captured by the communication device 120 or an image stored in the communication device 120, and is transmitted from the communication device 120 to the information processing device 100.

An image 1205 is changed content (also called a changed image). This image 1205 is an image generated by the information processing device 100 applying a machine learning model to the image 1201 and changing a portion other than the specific thing for sale in the image 1205 (i.e., the portion of the pair of jeans 1204) to a skirt 1208. Therefore, the model 1202 and the shirt 1203 in the changed image 1205 are not changed from those in the image 1201.

The information processing device 100 transmits, to the communication device 110, display information including content for a specific thing for sale or changed content. In the present embodiment, the display image is, for example, a search result for a specific thing for sale, page information of the thing for sale, an image list of the specific thing for sale, or the like.

The communication device 110 is a device that receives the display information provided by the information processing device 100 and presents the display information to the user. Furthermore, in response to a user operation, the communication device 110 transmits a search request for a thing for sale, a browse request of a page of a specific thing for sale, and the like to the information processing device 100.

For example, the communication device 120 transmits an image (i.e., the image 1201) of the above-described specific thing for sale to the information processing device 100. For example, the communication device 120 may capture the image 1201 in the communication device 120, or may acquire and store the image 1201 captured by an external device of the communication device 120.

<Configuration of Information Processing Device>

Figure 2:
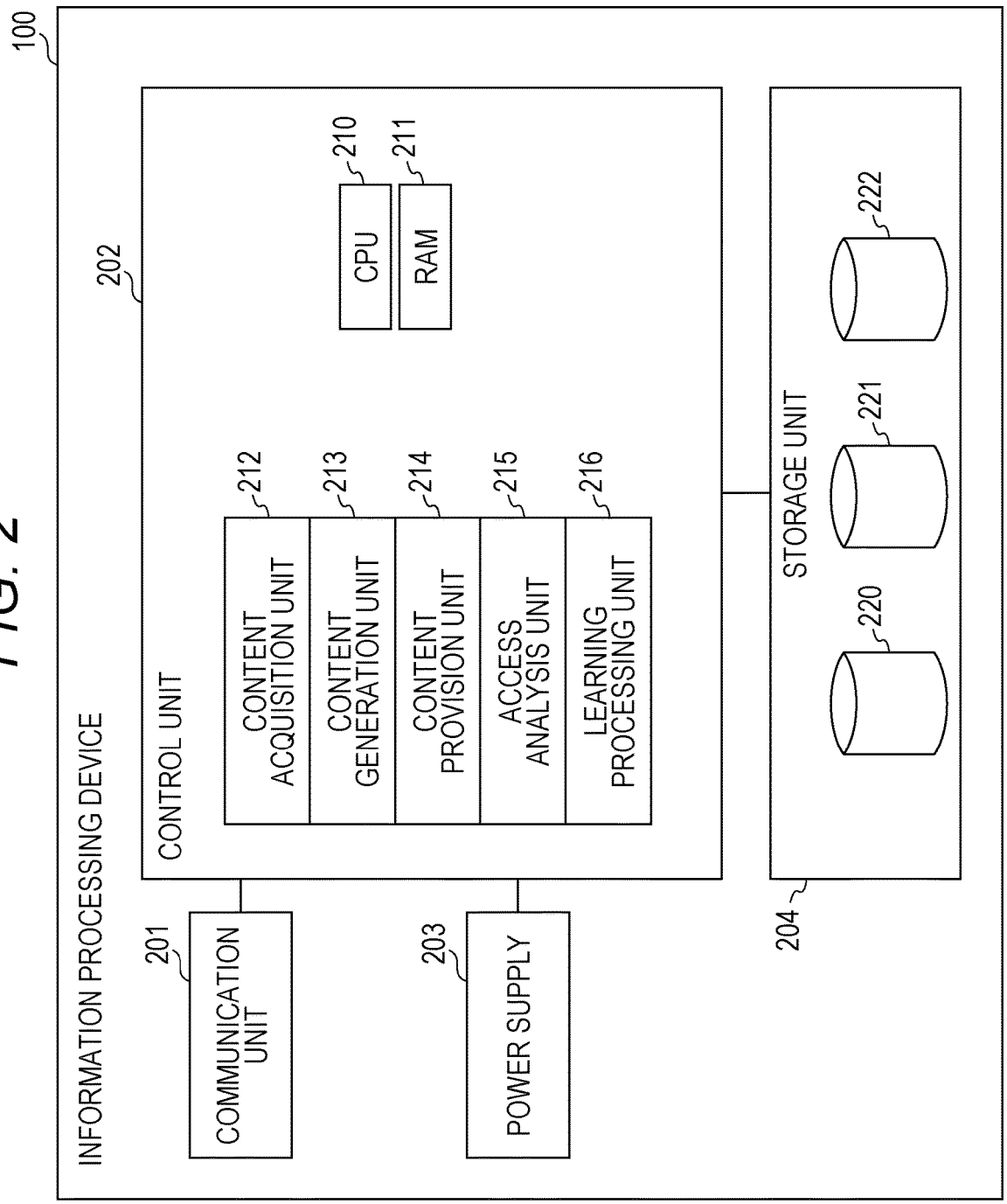
FIG. 2 is a block diagram showing a functional configuration example of an information processing device according to the present embodiment.

Next, a functional configuration example of the information processing device 100 will be described with reference to FIG. 2. Note that each of the functional blocks described with reference to the figure may be integrated or separated, and the described function may be implemented by another block. In addition, what is described as hardware may be implemented by software, and vice versa. Furthermore, in the present embodiment, a case where the information processing device 100 is a single device will be described as an example, but the information processing device 100 may include a plurality of devices or may be configured as one or more virtual machines.

A communication unit 201 includes a communication circuit or a communication module that communicates via a network with the communication device 110 and the communication device 120 used by the user.

A control unit 202 includes a CPU 210, which is a processor, and a RAM 211. The CPU 210 is a central processing unit, and may include one or more processors. Furthermore, the control unit 202 may be configured to further include a GPU in addition to the CPU 210 and the RAM 211 so as to be able to efficiently execute a machine learning model. By executing a computer program stored in a storage unit 204, the control unit 202 controls the operation of each unit of the information processing device 100 and executes content generation processing and access analysis processing that are described later.

The RAM 211 is a volatile storage medium such as a DRAM, and temporarily stores parameters, processing results, and the like for the control unit 202 to execute a computer program. A power supply unit 203 is a power supply for providing electric power for each unit of the information processing device 100 to operate.

The storage unit 204 includes, for example, a nonvolatile storage medium such as a hard disk or a semiconductor memory, and stores setting values necessary for the operation of the information processing device 100, a computer program, and the like. The computer program held in the storage unit 204 includes an operating system for implementing various functions of the information processing device 100 and various applications such as a browser. The storage unit 204 may include a database therein. The database includes, for example, a user DB 220, a content DB 221, and a change type DB 222.

Figure 8:
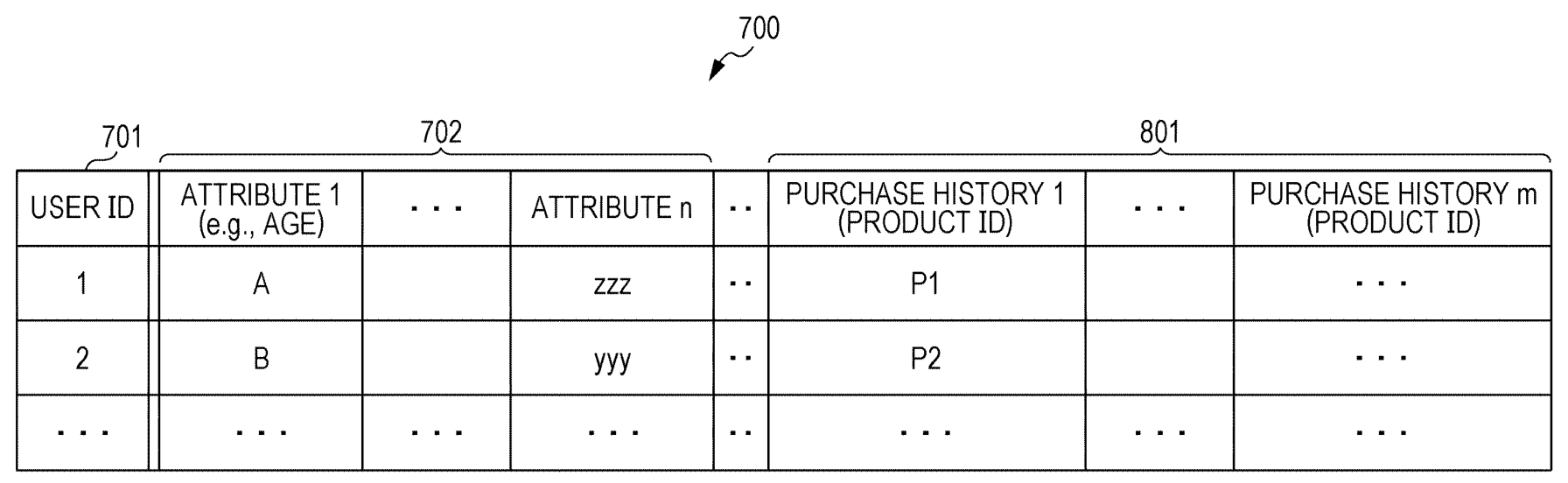

The user DB 220 stores data regarding a user who uses the electronic commerce service provided by the information processing device 100. FIG. 7 shows a user table 700 stored in the user DB 220. The user table 700 includes a user ID 701, user attribute information 702, and an access history 703. The user ID 701 is information for uniquely specifying the user. The attribute information 702 of the user may include, for example, age, gender, and preference information, of each user. In the access history 703, images (original) of a thing for sale accessed by the user and changed images generated by a machine learning model are accumulated in reverse chronological order of access, for example. Note that, as shown in FIG. 8, the user table 700 may further include or be associated with a purchase history 801 for a product purchased by the user in the electronic commerce service. In the content generation processing to be described later, the control unit 202 may preferentially select a change type similar to a purchased product by referring to a purchase history.

The content DB 221 stores data regarding content provided by the information processing device 100 in an electronic commerce service. FIG. 9 shows a content table 900 stored in the content DB 221. The content table 900 includes a content ID 901, content information 902, and content meta information 903. The content ID 901 is information for uniquely specifying the content. The content information 902 includes a URL with respect to an entity of the content, information indicating what the thing for sale of the content is, and information for identifying the change type. The change type corresponds to a change type table 1100 shown in FIG. 11. The content meta information 903 describes information regarding a portion other than the model (fashion model) and the thing for sale in the content. By using the meta information 903 of the content, it is not necessary for the information processing device 100 to execute again the recognition processing for the fashion model, clothing, and the like, and the processing by the information processing device 100 is speeded up.

The change type DB 222 is data indicating contents changeable in the content for each thing for sale handled in the electronic commerce service provided by the information processing device 100. FIG. 11 shows an example of the change type table 1100 in a case where the thing for sale is a shirt.

In addition to the DB described above, the storage unit 204 may further store substantive data of content and learning data for learning a machine learning model. The substantive data of content is, for example, image data regarding the thing for sale transmitted from the communication device 120. The learning data may be, for example, data of collection of a large amount of images (e.g., in a case where a pair of jeans is changed to a skirt, images of pairs of jeans and images of skirts are displayed) related to the portion to be changed in the content.

A content acquisition unit 212 acquires image data regarding a thing for sale transmitted from the communication device 120 and stores the image data in the storage unit 204. The content acquisition unit 212 may further receive, from the communication device 120, information regarding content such as what the thing for sale is, who the model is, what that hairstyle is, and what the portion other than the thing for sale is, and store the information in the content DB 221.

A content generation unit 213 includes, for example, a machine learning model that can generate content such as an image. For example, the content generation unit 213 applies the machine learning model to an image for a specific thing for sale (e.g., a shirt) to generate a changed image in which a portion (e.g., a portion of a pair of jeans) other than the thing for sale in the image is changed to another clothing (e.g., a skirt). The content generation unit 213 generates changed content by using a machine learning model using an algorithm of, for example, known instaGAN (instance-aware Generative Adversarial Network, https://arxiv.org/pdf/1812.10889.pdf).

Figure 13:
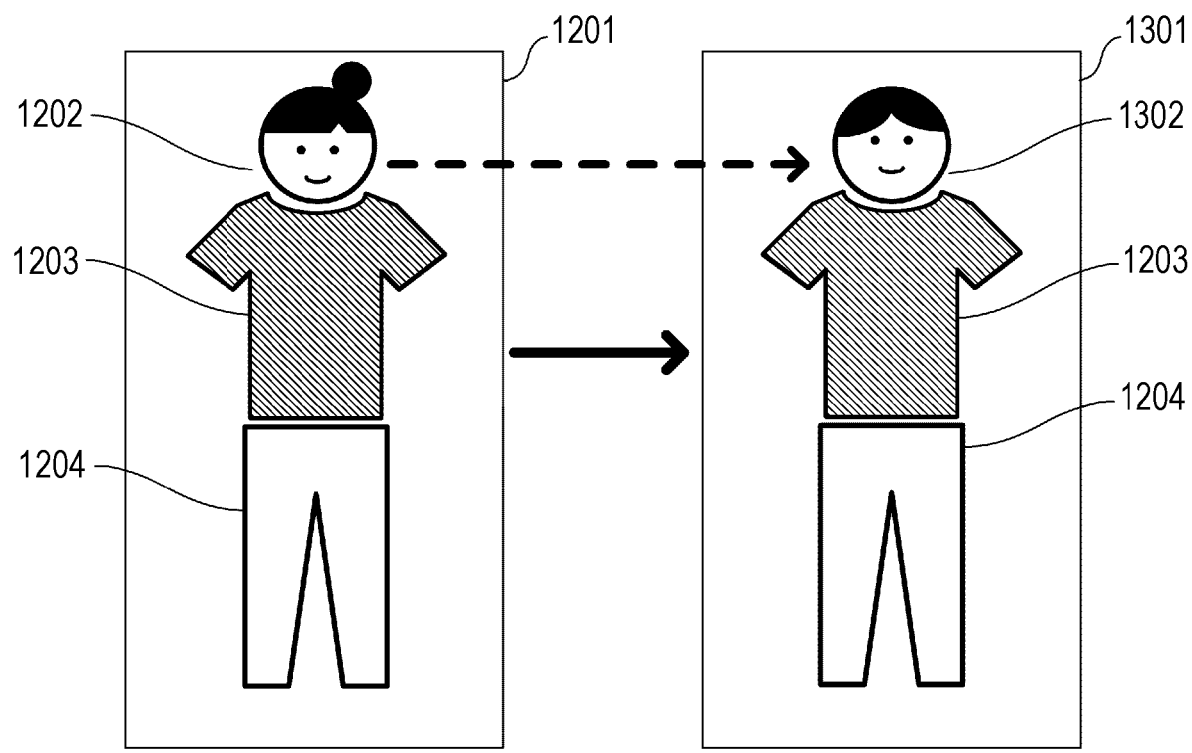
FIG. 13 is a view showing an example of changed content according to the present embodiment.
Figure 14:
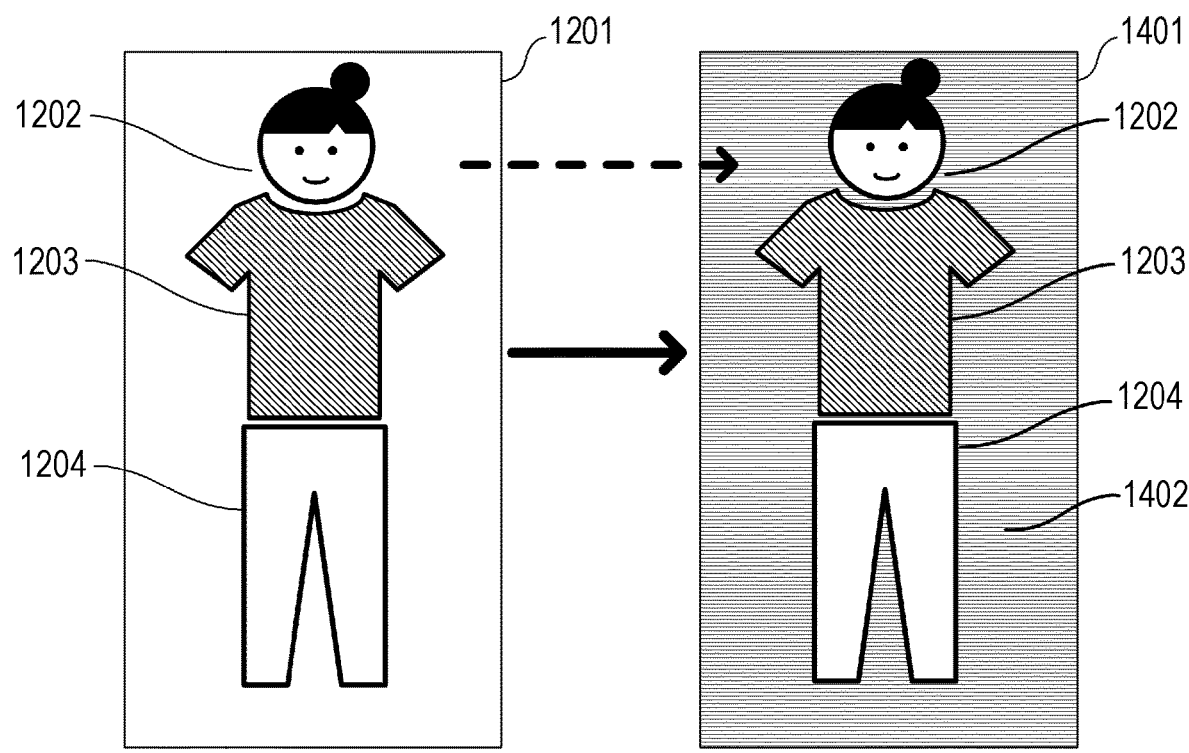
FIG. 14 is a view showing an example of changed content according to the present embodiment.

The content generation unit 213 is configured to generate a plurality of changed images different from each other for a portion other than the thing for sale in the image. For example, the content generation unit 213 generates the changed image 1205, as described with reference to FIG. 12, in which the portion of the pair of jeans is changed while maintaining the shirt for sale, and further generates a changed image 1301 in which a portion of (the face of) the model in the image is changed as shown in FIG. 13. Furthermore, the content generation unit 213 generates a changed image 1401 in which a background portion in the image is changed as shown in FIG. 14. In order to generate a plurality of different changed images, the content generation unit 213 may use, for example, each learned machine learning model for changing each portion in the image. That is, the content generation unit 213 may use a first machine learning model for changing the pair of jeans in the image to the skirt, a second machine learning model for changing the face of the model in the image, and a third machine learning model for changing the background portion in the image. Thus, the content generation unit 213 generates changed images different from each other, whereby it becomes possible to collect and analyze the user's reaction to these changed images.

In response to reception of a search request (or a browse request) from the communication device 110, a content provision unit 214 provides the communication device 110 with an image of the thing for sale corresponding to the search request (or the browse request). At this time, the image provided from the content provision unit 214 is an image (e.g., an image including a shirt and a pair of jeans) of the thing for sale or a changed image (e.g., an image including a shirt and a skirt). For example, the content provision unit 214 may select and provide the changed image in accordance with the user, or may randomly select and provide the changed image to a user of a specific group. The changed image is selected so that an analysis of access by the user can be performed.

An access analysis unit 215 executes the access analysis processing described later. For example, the access analysis unit 215 monitors the access of the communication device 110 to an image of a specific thing for sale or a changed image provided by the information processing device 100, and collects information regarding the number of accesses to them. In addition, the access analysis unit 215 compares the number of accesses with respect to the changed image provided to one or a plurality of users, and specifies a changed image having a high number of accesses.

For example, a learning processing unit 216 causes a machine learning model using the instaGAN algorithm to be learned. The learning data stored in the storage unit 204 is used for the learning of the machine learning model. In a case where separate machine learning models are used to generate a plurality of changed images, the machine learning model for each of the changed images is learned by using the corresponding learning data.

<Configuration of Communication Device 110>

Figure 3:
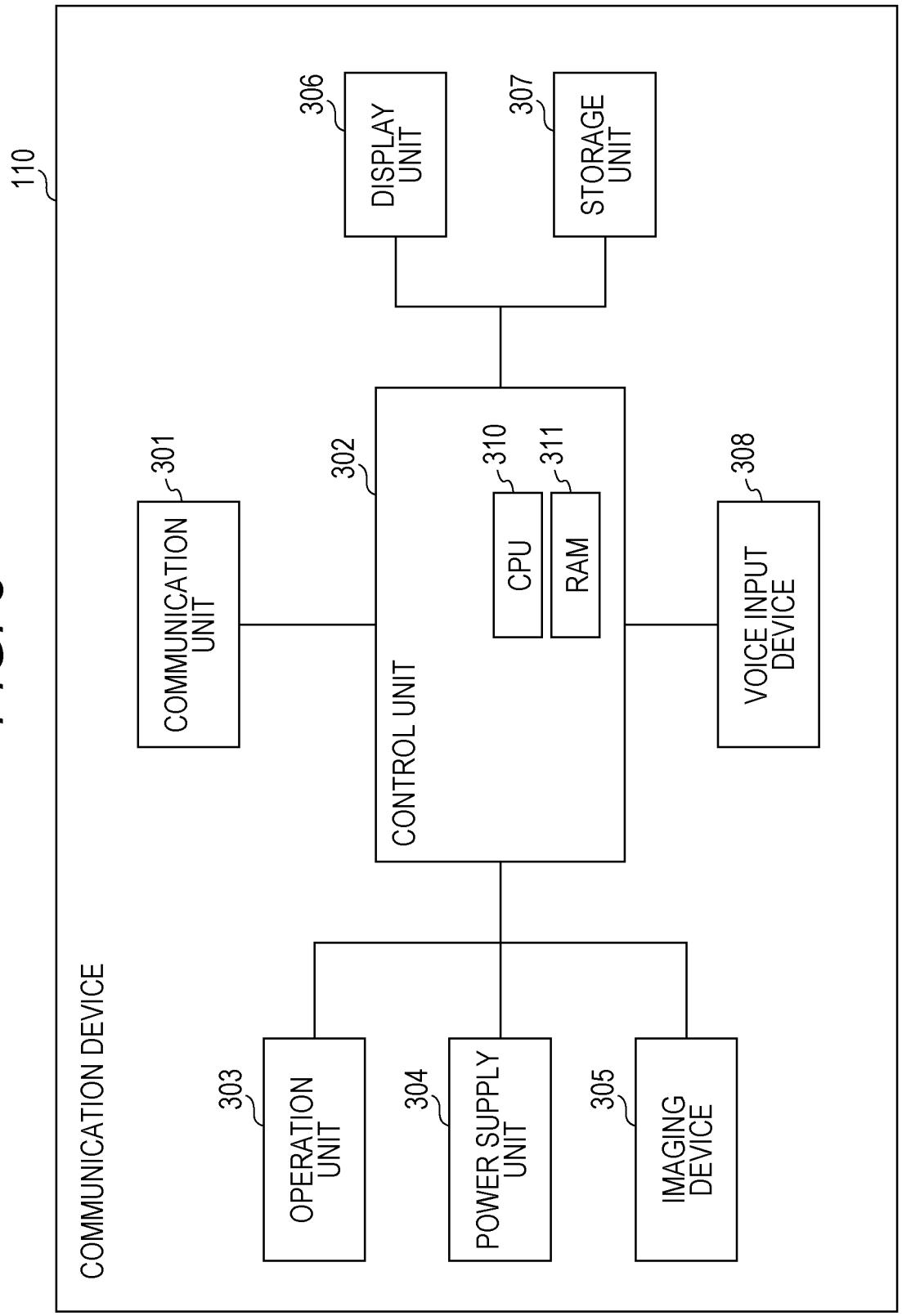
FIG. 3 is a block diagram showing a functional configuration example of a communication device according to the present embodiment.

Next, a functional configuration example of the communication device 110 will be described with reference to FIG. 3. In the present embodiment, a case of use of a smartphone will be described as an example of the communication device, but the communication device may be another electronic device such as a tablet terminal. Note that each of the functional blocks described with reference to the subsequent figure may be integrated or separated, and the described function may be implemented by another block. In addition, what is described as hardware may be implemented by software, and vice versa.

A communication unit 301 includes, for example, a communication circuit, and performs communication with the information processing device 100 by connecting to the Internet via mobile communication such as LTE or connecting to a network via wireless LAN communication, for example.

A control unit 302 includes a CPU 310 and a RAM 311, and controls the operation of each unit in the communication device 110 by the CPU 310 executing the computer program recorded in a storage unit 307, for example. The CPU 310 includes one or more processors. In addition, the RAM 311 includes a volatile semiconductor memory such as a DRAM.

An operation unit 303 includes a touch screen and a keyboard included in the communication device 110. The operation unit 303 receives an operation (e.g., input of a search keyword for a thing for sale or a browsing operation) on a GUI for various operations displayed on a display unit 306. A power supply unit 304 provides electric power to each unit of the communication device 110. An imaging device 305 is, for example, a camera mechanism including an imaging element, and performs imaging in response to an instruction from the control unit 302.

The display unit 306 includes a display device such as an LCD or an OLED, for example. In response to an instruction from the control unit 302, the display unit 306 displays a GUI for inputting a search condition for the thing for sale, a GUI for displaying a search result, and the like.

The storage unit 307 includes, for example, a non-volatile memory such as a semiconductor memory, and holds the program executed by the control unit 302 and a setting value. The computer program held in the storage unit 307 includes an operating system for implementing various functions of the communication device 110 and various applications such as a browser.

A voice input device 308 includes, for example, a microphone, and inputs a voice uttered by the user using the communication device 110. The voice input device 308 may have a function of not only inputting a voice uttered by the user but also recognizing a voice uttered by the user and inputting input information (e.g., designation of a search keyword) to the application.

<Configuration of Communication Device 120>

The functional configuration of the communication device 120 may be substantially similar to the functional configuration of the communication device 110 except transmission of content of a thing for sale to the information processing device 100. Note that the CPU 310 of the communication device 120 executes a computer program recorded in the storage unit 307 of the communication device 120, for example, thereby controlling the operation of each unit in the communication device 120.

<Series of Operations of Content Generation Processing in Information Processing Device>

Figure 4:
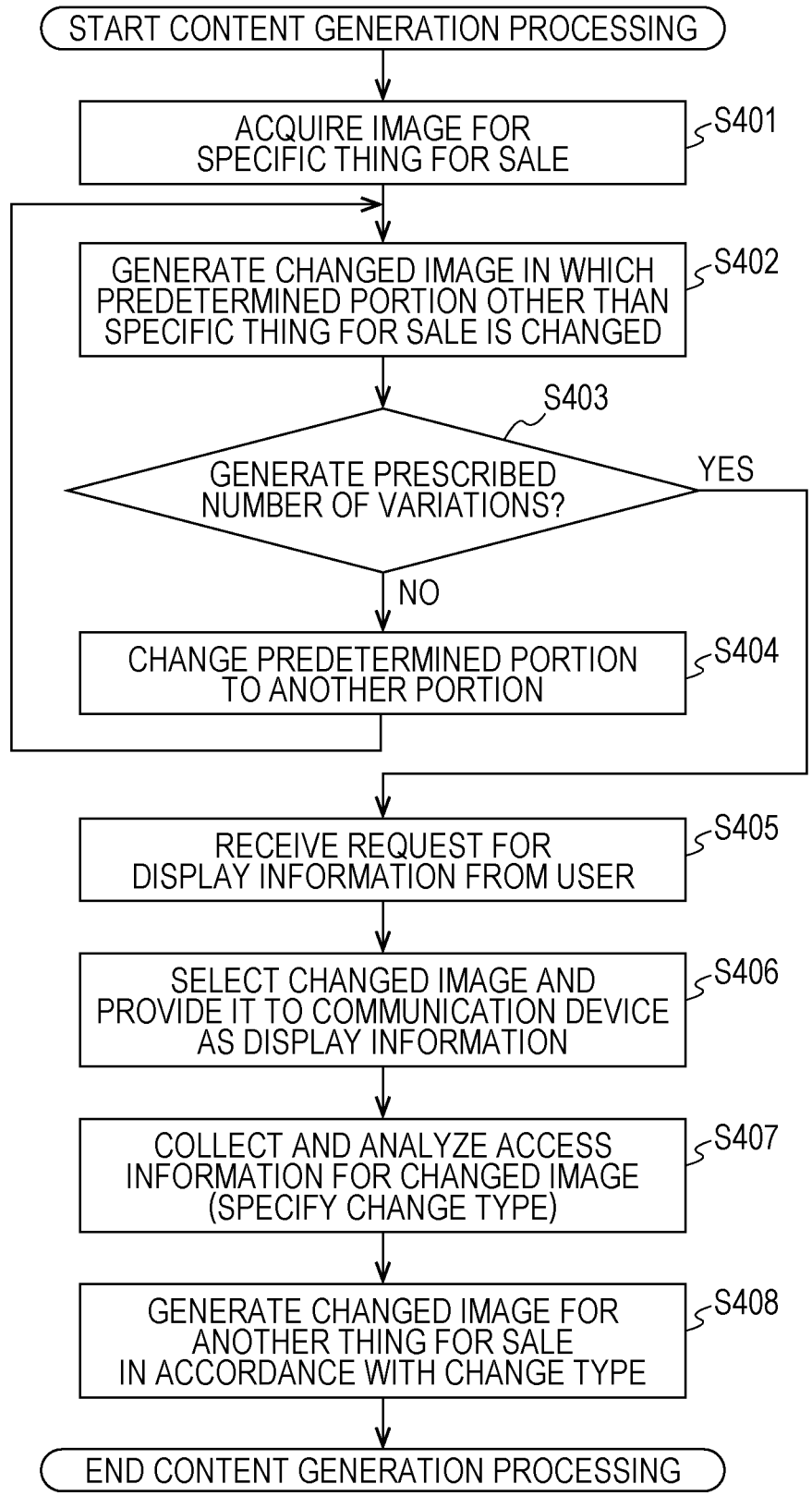
FIG. 4 is a flowchart showing a series of operations of content generation processing according to the present embodiment.

Next, a series of operations of content generation processing executed in the information processing device 100 will be described with reference to FIG. 4. This processing is performed by the CPU 210 of the control unit 202 executing a computer program recorded in the storage unit 204. In the following description, processing subjects of each step will be collectively described as the control unit 202 for easy description, but each unit functioning in the control unit 202 executes corresponding processing in accordance with the processing contents.

In S401, the control unit 202 acquires an image of a specific thing for sale from the communication device 120. The image of the specific thing for sale is transmitted from the communication device 120 in response to a user operation on the communication device 120, for example.

In S402, the control unit 202 applies the learned machine learning model to the image for the specific thing for sale acquired in S401 to generate a changed image in which a predetermined portion other than the specific thing for sale is changed. For example, the control unit 202 designates one of change types to be described later and causes the content generation unit 213 to generate a changed image.

In S403, the control unit 202 determines whether the changed image has been generated for as much as a prescribed variation. The prescribed variation is, for example, a change type shown in the change type table 1100 shown in FIG. 11. Depending on what the specific thing for sale is, a valid change type may be extracted, and the extracted change type may be a prescribed variation. For example, in a case where the specific thing for sale is a "shirt", a predetermined change type valid for the "shirt" may be extracted from the change type table 1100. Alternatively, a predetermined change type may be extracted from the change type table 1100 in accordance with the attribute of the user (gender, age, or preference information). Thus, if a valid change type is determined in advance for the thing for sale and the attribute of the user, it becomes not necessary to generate a changed image for a change type having a low effect among various change types. That is, the calculation cost in the control unit 202 can be reduced, and the processing speed can be increased. The control unit 202 proceeds to S405 if determining that a changed image corresponding to the extracted change type or all the change types has been generated, and the control unit 202 proceeds to S404 if otherwise.

In S404, the control unit 202 changes the predetermined portion other than the specific thing for sale in the image to another portion (where a changed image is not generated) in accordance with the change type table 1100. Thereafter, the control unit 202 returns to S402 again to generate a changed image.

In S405, the control unit 202 receives a request for display information from the communication device 110 used by the user. The request for display information is, for example, a search request in the electronic commerce service or a browse request for a certain thing for sale.

In S406, the control unit 202 selects a changed image and provides the communication device 110 with the changed image as display information. At this time, the control unit 202 may provide the communication device 110 with the image of the thing for sale (i.e., the original image) instead of selecting the changed image in accordance with the situation. For example, the control unit 202 may select a changed image and transmit it to the communication device 110 in a case of having provided the user with the (original) image of the thing for sale more than a predetermined number of times. That is, the user may be provided with the original image of the thing for sale a few times to increase a favorable impression on the thing for sale, and may be provided with information in which the way of showing is changed before the interest of the user decreases.

For example, in a case where the request from the communication device 110 is a search request, the control unit 202 transmits the information of the search result and the image of the thing for sale (or the changed image) to the communication device 110 as display information. When the display information in the case of transmitting the search result is displayed on the communication device 110, for example, as shown in FIG. 10A. In this example, advertisements 1004 to 1006 related to the search keyword are displayed above a search result 1003 for "shirt" on a search result screen 1001 in a case where "shirt" is input in a search window 1002. At this time, among the advertisements 1004 to 1006, the advertisement 1004 is an image of the thing for sale. The control unit 202 may make the advertisement 1004 a changed image instead of the image of the thing for sale. In the case of displaying the changed image, the control unit 202 selects one of a plurality of changed images generated in S402 to S404, for example. For example, the control unit 202 may randomly select a changed image from the plurality of changed images and transmit the changed image to the communication device 110.

Alternatively, the control unit 202 may transmit, to the communication device 110, the display information of the search result as shown in FIG. 10B, for example. In this example, on a search result screen 1010 in the case where "shirt" is input in the search window 1002, a search result 1011 for "shirt" is displayed based on images 1012 to 1014 and the like related to the search keyword. At this time, among the images 1012 to 1014, the image 1012 is an (original) image of the thing for sale. The control unit 202 may make the image 1012 a changed image instead of the image of the thing for sale. In the case of displaying the changed image, the control unit 202 selects one of a plurality of changed images generated in S402 to S404, for example. For example, the control unit 202 may randomly select a changed image from the plurality of changed images and transmit the changed image to the communication device 110.

Thus, the control unit 202 may provide the communication device 110 with the image of the thing for sale or the changed image as an advertisement included in the display information, or may provide the communication device 110 with the image of the thing for sale or the changed image as an image of the product or the like included in the display information.

Furthermore, in the above embodiment, the display information of the search result has been described as an example. However, for example, in response to a browse request for one piece of product information from the communication device 110, an image of a thing for sale or a changed image may be provided to the communication device 110 as an advertisement to be presented in the product information.

In S407, the control unit 202 collects the access of the user (by the communication device 110) to the advertisement or the image provided in S406, and analyzes the access information to the changed image. The access of the user to individual advertisements or images is stored and accumulated in the access history of the user table 700 as described above. Specific processing in this step will be described later as access analysis processing. By analyzing the access of the user, the control unit 202 specifies a change type with a high number of accesses. That is, the control unit 202 can specify what a changed image that attracts the user's interest is like. In addition, by specifying a change type having a high number of accesses, it becomes only required to generate a changed image by focusing on a change type having a high effect among various change types. That is, it is not necessary to generate a changed image for a change type having a low effect. Therefore, the calculation cost in the control unit 202 can be reduced, and the processing speed can be increased.

In S408, the control unit 202 generates changed content for another thing for sale in accordance with the specified change type. That is, in the processing of S402 to S407, the control unit 202 analyzes and specifies the change type effective for access for the thing for sale "shirt", for example. Hence, the control unit 202 generates a changed image in accordance with the specified change type for another thing for sale, for example, "jacket". This makes it possible to easily generate a changed image having a high advertisement effect or presentation effect, and provide the changed image to the user. When the processing of S408 ends, the control unit 202 ends the series of operations of the content generation processing.

<Series of Operations of Access Analysis Processing in Information Processing Device>

Figure 5:
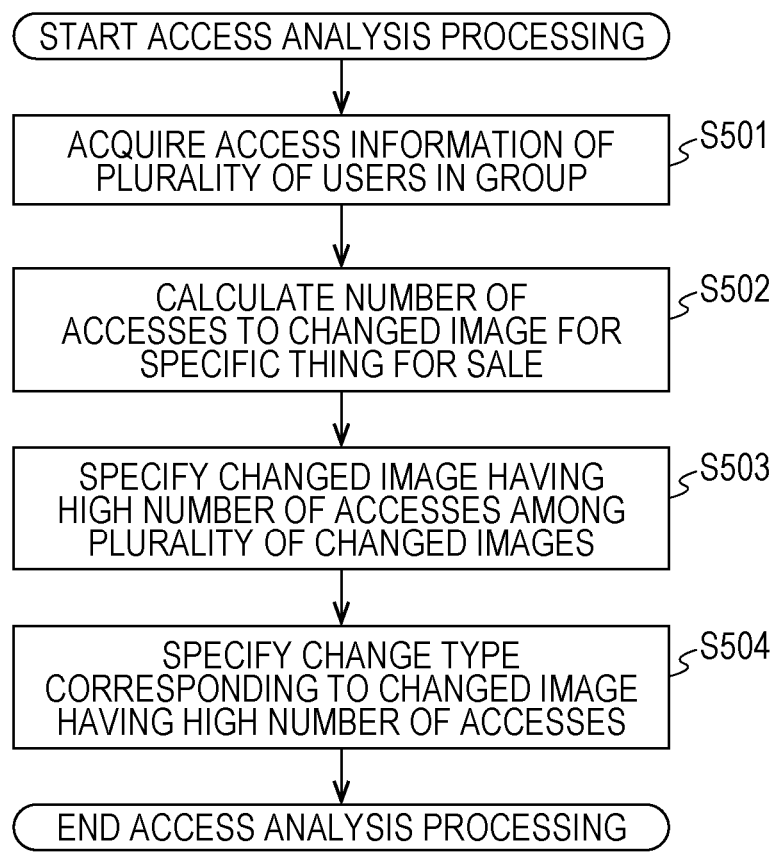
FIG. 5 is a flowchart showing a series of operations of access analysis processing as an example according to the present embodiment.

Next, a series of operations of access analysis processing executed in the information processing device 100 will be described with reference to FIG. 5. The access analysis processing shown in FIG. 5 is an operation in which the operation of S407 of the above-described content generation processing is more detailed. Therefore, this processing is implemented by the CPU 210 of the control unit 202 executing the computer program recorded in the storage unit 204. In the following description, processing subjects of each step will be collectively described as the control unit 202 for easy description, but each unit (mainly the access analysis unit 215) functioning in the control unit 202 executes corresponding processing in accordance with the processing contents.

The access analysis processing shown in FIG. 5 is an example of the analysis processing, and is processing of specifying a change type with a high number of accesses in a certain group based on access information by a plurality of users forming the group. The group may be formed by a plurality of users having the same attribute, for example, and may be formed by a plurality of users having the same age or similar ages, for example. Alternatively, the group may be formed by a plurality of users having similar preferences. The plurality of users having similar preferences are, for example, similar users whose access histories shown in FIG. 7 belong to the same cluster by cluster analysis. Furthermore, the plurality of users having similar preferences may be similar users whose purchase histories (purchase histories shown in FIG. 8) using the electronic commerce service belong to the same cluster by cluster analysis.

In S501, the control unit 202 acquires access information of a plurality of users in the group. For example, the control unit 202 acquires information of the access history 703 of the user from the user table 700 described above.

In S502, the control unit 202 calculates the number of accesses to the changed image to be aggregated based on the access history 703 of each user acquired in S501. For example, when the thing for sale to be analyzed is the image 1201 of "shirt", the control unit 202 calculates the number of accesses to each of the changed image 1205, the changed image 1301, and the changed image 1401, which are the changed images of the image 1201.

In S503, the control unit 202 specifies a changed image having a high number of accesses among the plurality of changed images. For example, the control unit 202 specifies the changed image having the highest number of accesses from among the number of accesses to the changed image 1205, the number of accesses to the changed image 1301, and the number of accesses to the changed image 1401. The control unit 202 may specify a predetermined number of changed images having a high number of accesses.

In S504, the control unit 202 specifies the change type based on the changed image having a high number of accesses specified in S503. For example, if the number of accesses to the changed image 1205 is the highest, the control unit 202 specifies the change type of the image (the change type is a change from the jeans to the skirt) with reference to the change type of the content table 900. The change type to be specified may be plural in accordance with the processing of S503. After specifying the change type, the control unit 202 proceeds to S408 shown in FIG. 4.

Note that specifying the change type by the processing of S504 may be synonymous with specifying a machine learning model corresponding to the change type. For example, if the machine learning model used in the content generation unit 213 is different for each change type, that is, in a case of using a machine learning model corresponding to each of the case where an image in which the pair of jeans is changed to the skirt is generated and the case where an image in which the model in the image is changed is generated, the specification of the change type is synonymous with the identification of the machine learning model.

In the above-described access analysis processing, the case where the access information of a plurality of users having the same attribute as a predetermined attribute is analyzed has been described as an example. However, if there is no user having the same attribute as the predetermined attribute, or if a sufficient number of pieces of access information does not exist among users having the same attribute as the predetermined attribute, the number of accesses may be analyzed for users having an attribute (e.g., an age similar to the age of the user) similar to a predetermined attribute of the user.

Figure 6:
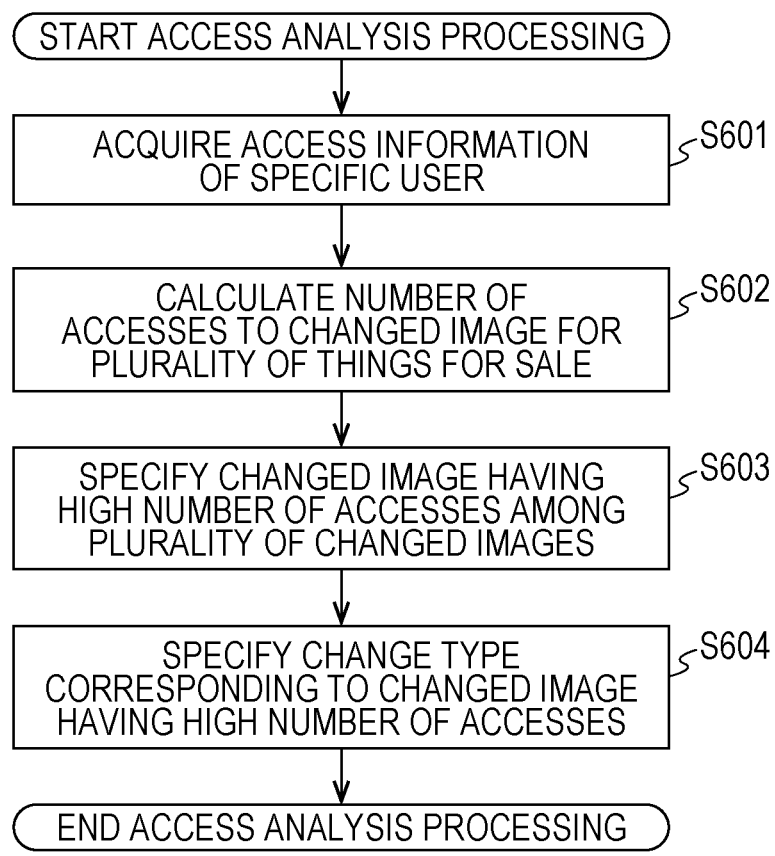
FIG. 6 is a flowchart showing a series of operations of access analysis processing as another example according to the present embodiment.

Another Example of Access Analysis Processing in Information Processing Device Next, another example of the access analysis processing executed in the information processing device 100 will be described with reference to FIG. 6. Similarly to FIG. 5, the access analysis processing shown in FIG. 6 is an operation in which the operation of S407 of the above-described content generation processing is more detailed. Therefore, this processing is implemented by the CPU 210 of the control unit 202 executing the computer program recorded in the storage unit 204. In the following description, processing subjects of each step will be collectively described as the control unit 202 for easy description, but each unit (mainly the access analysis unit 215) functioning in the control unit 202 executes corresponding processing in accordance with the processing contents.

The operation of the access analysis processing shown in FIG. 6 is an example different from the analysis processing shown in FIG. 5, and is an operation of specifying a change type having a high number of accesses among accesses by one user based on access information of the one user. That is, this processing is processing of analyzing the most effective change type for each user. Before this processing is executed, some changed images generated in S402 to 404, for example, are presented to one user in advance as display information.

In S601, the control unit 202 acquires access information of a specific user. For example, the control unit 202 acquires the access information 703 associated with a user ID of the user to be analyzed.

In S602, the control unit 202 calculates the number of accesses to the plurality of changed images. That is, the control unit 202 calculates the number of accesses to the plurality of content IDs from the access information 703.

In S603, the control unit 202 specifies a changed image having a high number of accesses among the plurality of changed images. In a case where the changed images 1205, 1301, and 1401 are presented in advance as the display information to one user, the control unit 202 specifies the changed image having a high number of accesses from among the number of accesses to the changed image 1205, the number of accesses to the changed image 1301, and the number of accesses to the changed image 1401. The control unit 202 may specify a predetermined number of changed images having a high number of accesses.

In S604, the control unit 202 specifies the change type based on the changed image having a high number of accesses specified in S603. For example, if the number of accesses to the changed image 1205 is the highest, the control unit 202 specifies the change type of the image with reference to the change type of the content table 900. The control unit 202 may specify a plurality of change types having a high number of accesses. After specifying the change type, the control unit 202 proceeds to S408 shown in FIG. 4.

Note that in the above-described embodiment, the case where one original image of the thing for sale or one changed image is displayed on the search result screen shown in FIGS. 10A and 10B has been described as an example. However, the original image of the thing for sale and the changed image may be simultaneously displayed. For example, the control unit 202 may transmit the display information 1010 of the search result as shown in FIG. 15 to the communication device 110. In this example, on a search result screen 1010 in the case where "shirt" is input in the search window 1002, a search result 1501 for "shirt" is displayed based on images 1012, 1013, 1502, and the like related to the search keyword. At this time, one of the images of the thing for sale is the original image 1012 of the thing for sale, and the other is the changed image 1502. Even with such display, it is possible to increase the opportunity for the user to be exposed to the thing for sale, whilst the same image will not be presented, and it is also possible to prevent the interest of the user from decreasing.

Furthermore, a plurality of changed images for the same thing for sale may be simultaneously displayed on the screen of the search result. For example, the control unit 202 may transmit the display information 1010 of the search result as shown in FIG. 16 to the communication device 110. In this example, on a search result screen 1010 in the case where "shirt" is input in the search window 1002, a search result 1601 for "shirt" is displayed based on images 1602, 1013, 1603, and the like related to the search keyword. At this time, one of the images of the thing for sale is the changed image 1602 in which the pair of jeans is changed to a skirt. The other is the changed image 1603 in which the model portion is changed. The display information of the search result is effective in a case where the original image of the thing for sale is presented to the browsing user a predetermined number of times or more. Even with such display, it is possible to increase the opportunity for the user to be exposed to the thing for sale, whilst the same image will not be presented, and it is also possible to prevent the interest of the user from decreasing.

As described above, in the present embodiment, the control unit 202 applies the machine learning model to an image for a specific thing for sale to generate a changed image in which a portion other than the specific thing for sale in the image is changed. Then, by transmitting the generated changed image to the communication device 110, the generated changed image is provided to the user. In addition, when an image for another thing for sale is used, a machine learning model for changing a predetermined portion in accordance with an action of the user with respect to the changed content is applied to an image for another thing for sale, and a changed image for another thing for sale is generated. This makes it possible to generate effective content for a thing for sale that attracts an interest of a user. Furthermore, the control unit 202 collects information of the user's access to the changed image, and specifies the change type corresponding to the changed image having a high number of accesses based on the information of the access. This makes it possible to specify a change method of an image having a high advertisement effect or presentation effect, and possible to suppress generation of a changed image having a low effect, and hence it is possible to speed up the calculation processing related to content provision and reduce necessary calculation resources.

Summary of Embodiments (1)

In the above-described embodiment, an information processing device is provided.

An information processing device includes:

one or more processors; and a memory storing one or more programs, in which when executed by the one or more processors, the one or more programs cause the one or more processors to:

apply a machine learning model to content for a specific thing for sale to generate changed content in which a predetermined portion other than the specific thing for sale in the content is changed, provide a user with the changed content having been generated, and apply a machine learning model to content for another thing for sale and change a predetermined portion other than the other thing for sale in accordance with an action of the user with respect to the changed content in the content for the other thing for sale to generate changed content for the other thing for sale.

(2)

In the above-described embodiment, the one or more programs further cause the one or more processors to collect access information of the user to the changed content, and specify, based on the access information, a change type corresponding to changed content having a high number of accesses, and the predetermined portion other than the other thing for sale is a portion corresponding to the specified change type other than the other thing for sale.

(3)

In the above-described embodiment, specifying the change type is based on comparison between a user's access to first content in which a first portion other than the specific thing for sale in the content is changed and a user's access to second content in which a second portion other than the specific thing for sale in the content is changed.

(4)

In the above-described embodiment, specifying the change type includes specifying a change type corresponding to changed content having a high number of accesses by a plurality of users in a group based on information on accesses of a plurality of users in the group.

(5)

In the above-described embodiment, specifying the change type includes specifying a change type having a high number of accesses by a specific user based on information on accesses of the specific user to changed content for a plurality of things for sale.

(6)

In the above-described embodiment, the specific thing for sale is a product dealt with in an electronic commerce service, and a predetermined portion other than the specific thing for sale includes at least any of a portion of a person who uses the product, a pose of a person who uses the product, and a background portion in the content.

(7)

In the above-described embodiment, specifying the change type includes specifying any machine learning model of a machine learning model for generating the first content in which the first portion in the content is changed or a machine learning model for generating the second content in which the second portion in the content is changed.

(8)

In the above-described embodiment, specifying the change type includes specifying a change type corresponding to changed content having a high number of accesses by a plurality of users having a first attribute based on information on accesses of a plurality of users having a same attribute as the first attribute of a user.

(9)

In the above-described embodiment, specifying the change type includes, in a case where there is no information on accesses of a plurality of users having a same attribute as a first attribute of a user, specifying a change type corresponding to changed content having a high number of accesses by a plurality of users having a second attribute based on information on accesses of a plurality of users having the second attribute similar to the first attribute.

(10)

In the above-described embodiment, after content for the specific thing for sale is provided to the user, the changed content having been generated is provided to the user.

(11)

In the above-described embodiment, providing the user with the changed content includes providing the user with the changed content in response to receiving a request of searching for the specific thing for sale.

(12)

In the above-described embodiment, content for a specific thing for sale is an image for a specific product.

(13)

In the above-described embodiment, content for a specific thing for sale is a moving image for a specific product.

(14)

In the above-described embodiment, content for a specific thing for sale is text for a specific product.

(15)

In the above-described embodiment, an information processing method is provided.

An information processing method comprises:

applying a machine learning model to content for a specific thing for sale to generate changed content in which a predetermined portion other than the specific thing for sale in the content is changed, providing a user with the changed content having been generated, and applying a machine learning model to content for another thing for sale and changing a predetermined portion other than the other thing for sale in accordance with an action of the user with respect to the changed content in the content for the other thing for sale to generate changed content for the other thing for sale.

(16)

In the above-described embodiment, a computer-readable medium is provided.

A non-transitory computer-readable medium comprises instructions of one or more programs executed by one or more processors of an information processing device, wherein the one or more programs, when executed by the one or more processors, cause the information processing device to:

apply a machine learning model to content for a specific thing for sale to generate changed content in which a predetermined portion other than the specific thing for sale in the content is changed, provide a user with the changed content having been generated, and apply a machine learning model to content for another thing for sale and change a predetermined portion other than the other thing for sale in accordance with an action of the user with respect to the changed content in the content for the other thing for sale to generate changed content for the other thing for sale.

The invention is not limited to the above embodiment, and various modifications and changes can be made within the scope of the gist of the invention.

What is claimed is:

1. An information processing device comprising:
one or more processors; and
a memory storing one or more programs, wherein
when executed by the one or more processors, the one or more programs cause the one or more processors to:
electrically acquire a first image from a first communication device connected to the information processing device via a network, the first image comprising a first portion indicating a first item which is a first product, a second portion different from the first portion, and a third portion different from the first portion and the second portion, wherein the second portion indicates a second item different from the first item, the third portion indicates a third item different from the first item and the second item, apply a first machine learning model to the first image according to a predetermined first change type, which is stored in the memory, to change the second item to a fourth item different from the first item, the second item and the third item, to generate a first changed image in which the second item indicated by the second portion in the first image is changed to the fourth item, and the first portion and the third portion in the first image are not changed, apply a second machine learning model to the first image according to a predetermined second change type, which is stored in the memory, to change the third item to a fifth item different from the first item, the second item, the third item and the fourth item, to generate a second changed image in which the third item indicated by the third portion in the first image is changed to the fifth item, and the first portion and the second portion in the first image are not changed, electrically provide a plurality of second communication devices, which are connected to the information processing device via the network, with the first changed image having been generated by the first machine learning model and the second changed image having been generated by the second machine learning model, collect a number of accesses by the plurality of second communication devices to the first changed image and the second changed image, specify, based on the collected number of accesses, a changed image which is either one of the first changed image or the second changed image having a higher number of accesses, specify, based on the specified changed image having the higher number of accesses, a changed type which is either one of the first change type or the second change type corresponding to the specified changed image having the higher number of accesses, and apply a third machine learning model to a second image including a fourth portion indicating a second product different from the first product, a fifth portion indicating the second item, and a sixth portion indicating the third item, to generate a third changed image in which either one of the second item indicated by the fifth portion or the third item indicated by the sixth portion in the second image is changed according to the specified change type having the higher number of accesses, and the fourth portion and another one of the second item indicated by the fifth portion or the third item indicated by the sixth portion in the second image are not changed, wherein no image, in which the another one of the second item indicated by the fifth portion or the third item indicated by the sixth portion in the second image is changed according to another change type which is either one of the first change type or the second change type having a lower number of accesses based on the collected number of accesses, is generated, and the first machine learning model, the second machine learning model and the third machine learning model are generative models and generate the first changed image, the second changed image and the third changed image, respectively, using an algorithm of generative adversarial network.

2. The information processing device according to claim 1, wherein the plurality of second communication devices belong to a group formed based on attributes of a plurality of users of the plurality of second communication devices.

3. The information processing device according to claim 1, wherein
at least one of the first product or the second product is a product dealt with in an electronic commerce service, and
each of the second portion, the third portion, the fifth portion and the sixth portion is one selected from the group consisting of a portion of a person who uses the first product or the second product, a pose of a person who uses the first product or the second product, and a background portion in the image.

4. The information processing device according to claim 1, wherein the second portion and the third portion in the first image are determined in accordance with the first product or attributes of a plurality of users of the plurality of second communication devices.

5. An information processing device comprising:
one or more processors; and
a memory storing one or more programs, wherein
when executed by the one or more processors, the one or more programs cause the one or more processors to:
electrically acquire a first image from a first communication device connected to the information processing device via a network, the first image comprising a first portion indicating a first item which is a first product, a second portion different from the first portion, and a third portion different from the first portion and the second portion, wherein the second portion indicates a second item different from the first item, the third portion indicates a third item different from the first item and the second item,
apply a first machine learning model to the first image according to a predetermined first change type, which is stored in the memory, to change the second item to a fourth item different from the first item, the second item and the third item, to generate a first changed image in which the second item indicated by the second portion in the first image is changed to the fourth item, and the first portion and the third portion in the first image are not changed,
apply a second machine learning model to the first image according to a predetermined second change type, which is stored in the memory, to change the third item to a fifth item different from the first item, the second item, the third item and the fourth item, to generate a second changed image in which the third item indicated by the third portion in the first image is changed to the fifth item, and the first portion and the second portion in the first image are not changed,
electrically provide a second communication device, which is connected to the information processing device via the network, with the first changed image having been generated by the first machine learning model and the second changed image having been generated by the second machine learning model,
collect a number of accesses by the second communication device to the first changed image and the second changed image,
specify, based on the collected number of accesses, a changed image which is either one of the first changed image or the second changed image having a higher number of accesses,
specify, based on the specified changed image having the higher number of accesses, a changed type which is either one of the first change type or the second change type corresponding to the specified changed image having the higher number of accesses, and
apply a third machine learning model to a second image including a fourth portion indicating a second product different from the first product, a fifth portion indicating the second item, and a sixth portion indicating the third item, to generate a third changed image in which either one of the second item indicated by the fifth portion or the third item indicated by the sixth portion in the second image is changed according to the specified change type having the higher number of accesses, and the fourth portion and another one of the second item indicated by the fifth portion or the third item indicated by the sixth portion in the second image are not changed,
wherein no image, in which the another one of the second item indicated by the fifth portion or the third item indicated by the sixth portion in the second image is changed according to another change type which is either one of the first change type or the second change type having a lower number of accesses based on the collected number of accesses, is generated, and
the first machine learning model, the second machine learning model and the third machine learning model are generative models and generate the first changed image, the second changed image and the third changed image, respectively, using an algorithm of generative adversarial network.

6. The information processing device according to claim 5, wherein the second portion and the third portion in the first image are determined in accordance with the first product or an attribute of a user of the second communication device.

* * * * *